US011831160B2

(12) United States Patent
Hua et al.

(10) Patent No.: US 11,831,160 B2
(45) Date of Patent: Nov. 28, 2023

(54) POWER LOAD DATA PREDICTION METHOD AND DEVICE, AND STORAGE MEDIUM

(71) Applicant: Siemens Aktiengesellschaft, Munich (DE)

(72) Inventors: Wen Tao Hua, Beijing (CN); Jing Li, Beijing (CN); Hao Liu, Beijing (CN); Dan Wang, Chengdu (CN); Ang Li, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/619,281

(22) PCT Filed: Jun. 21, 2019

(86) PCT No.: PCT/CN2019/092384
§ 371 (c)(1),
(2) Date: Dec. 15, 2021

(87) PCT Pub. No.: WO2020/252784
PCT Pub. Date: Dec. 24, 2020

(65) Prior Publication Data
US 2023/0096258 A1    Mar. 30, 2023

(51) Int. Cl.
*G06V 10/82* (2022.01)
*G06V 10/62* (2022.01)
(Continued)

(52) U.S. Cl.
CPC ............ *H02J 3/003* (2020.01); *G06F 18/15* (2023.01); *G06V 10/62* (2022.01); *G06V 10/82* (2022.01); *G06F 2123/02* (2023.01)

(58) Field of Classification Search
CPC .. G06N 3/08; G06N 20/00; G06N 5/01; G06T 2207/20081; G06T 2207/20084;
(Continued)

(56) References Cited

U.S. PATENT DOCUMENTS 5,332,968 A * 7/1994 Brown ................. G01R 33/563
324/309
5,515,480 A * 5/1996 Frazier ................. H04N 1/4058
358/1.9
(Continued)

FOREIGN PATENT DOCUMENTS

CN    108197773 A    6/2018
CN    108832619 A    11/2018
(Continued)

OTHER PUBLICATIONS

PCT International Search Report and Written Opinion of International Searching Authority corresponding to PCT International Application No. PCT/CN2019/092384 filed Jun. 21, 2019.

*Primary Examiner* — Darrin D Dunn
(74) *Attorney, Agent, or Firm* — Harness, Dickey & Pierce, P.L.C.

(57) ABSTRACT

A power load data prediction method and device, and a storage medium are disclosed. In an embodiment, the he method comprises: acquiring historical power load data of a one-dimensional time sequence, the historical power load data including values of corresponding time points; mapping the values of corresponding time points to a coordinate system in which a horizontal axis is a set time period, and a vertical axis is time points within the time period, and performing marking at each mapping point by using predetermined pixel values corresponding to the values to obtain a mapping image, wherein different values correspond to different pixel values; and inputting the pixel values of the mapping image to a trained data prediction model, and
(Continued)

acquiring a power load data prediction value output by the data prediction model. The method and device and the storage medium can improve the prediction accuracy of the power load data.

20 Claims, 4 Drawing Sheets

(51) Int. Cl.
  *H02J 3/00* (2006.01)
  *G06F 18/15* (2023.01)
  *G06F 123/02* (2023.01)
(58) Field of Classification Search
  CPC . G06T 2207/10016; G06T 2207/10024; G06T 7/75; G06T 3/4046; G06V 10/82; G06V 10/56; G05B 15/02; G05B 2219/2642; G05B 19/042; G05B 13/026; G05B 13/0265; G05B 13/027; G05B 13/048
  See application file for complete search history.

(56) References Cited

U.S. PATENT DOCUMENTS

| | | | |
|---|---|---|---|
| 5,729,661 A * | 3/1998 | Keeler | G06N 3/049 706/21 |
| 5,909,192 A * | 6/1999 | Finch | G01R 13/30 342/182 |
| 9,542,510 B2 * | 1/2017 | Fei | G06Q 50/06 |
| 10,360,702 B2 * | 7/2019 | Cervelli | G06T 11/206 |
| 10,410,113 B2 * | 9/2019 | Clayton | G06N 3/045 |
| 11,037,060 B2 * | 6/2021 | Nguyen | G06F 18/23 |
| 11,468,273 B2 * | 10/2022 | Zhu | G06F 18/214 |
| 2003/0101009 A1 * | 5/2003 | Seem | H02J 3/00 702/61 |
| 2012/0240072 A1 * | 9/2012 | Altamura | G06T 11/206 345/440 |
| 2014/0058572 A1 | 2/2014 | Stein et al. | |
| 2017/0249534 A1 * | 8/2017 | Townsend | G06N 3/04 |
| 2020/0193285 A1 * | 6/2020 | Ishii | G06N 3/08 |
| 2020/0242382 A1 * | 7/2020 | Yin | G06N 3/08 |
| 2020/0242744 A1 * | 7/2020 | Schafer | G06T 5/20 |
| 2020/0320343 A1 * | 10/2020 | Cohen | G06Q 30/0202 |
| 2021/0165130 A1 * | 6/2021 | Chang | G01W 1/12 |
| 2021/0383239 A1 * | 12/2021 | Chen | G06F 18/217 |
| 2022/0208065 A1 * | 6/2022 | Kubo | G09G 3/2003 |
| 2022/0217276 A1 * | 7/2022 | Takatori | G06V 10/70 |
| 2022/0236706 A1 * | 7/2022 | Li | G05B 19/042 |

FOREIGN PATENT DOCUMENTS

| | | |
|---|---|---|
| CN | 109740648 A | 5/2019 |
| CN | 109816145 A | 5/2019 |
| EP | 3076513 A1 | 10/2016 |
| JP | 2012244897 A | 12/2012 |

* cited by examiner

Figure 4

POWER LOAD DATA PREDICTION METHOD AND DEVICE, AND STORAGE MEDIUM

PRIORITY STATEMENT

This application is the national phase under 35 U.S.C. § 371 of PCT International Application No. PCT/CN2019/092384 which has an International filing date of Jun. 21, 2019, which designated the United States of America, the entire contents of each of which are hereby incorporated herein by reference.

FIELD

Embodiments of the present invention generally relate o the energy field, and in particular to a power load data prediction method, device, cloud platform, server and storage medium.

BACKGROUND

The power industry is the main infrastructure in the energy sector, and plays an important role in the development of industry and the quality of life. Power load is an important part of the electric power industry, which has a great impact on the stability of grid operation. Continuous overload will cause damage to electrical equipment, for example, transformers. In order to ensure the normal operation of the power grid, it is necessary to monitor the power load in advance.

SUMMARY

At present, power load is usually predicted based on the growth rate, and the growth rate is calculated based on user tags. However, the inventors discovered that the tags of registered users at the administration for power supply are relatively fixed, and these tags cannot reflect the latest conditions of users. Therefore, the inventors discovered that power load prediction based on the growth rate severely limits the prediction accuracy.

In view of this, a power load data prediction method is proposed in one embodiment of the present invention, and a power load data prediction device, a cloud platform, a server and a storage medium are provided in other embodiments, which are used to improve accuracy of power load data prediction.

The power load data prediction method proposed in an embodiment of the present invention comprises: acquiring historical power load data in a one-dimensional time series, which includes values at corresponding time points; mapping the values at corresponding time points to a coordinate system with points on the horizontal axis representing set time periods and points on the vertical axis representing time points in the time periods, and marking each mapping point with a predetermined pixel value corresponding to the value, to obtain a mapping image, wherein different values correspond to different pixel values; and inputting the pixel values of the mapping image into a trained data prediction model, and obtaining a predicted value of power load data output by the data prediction model.

Another power load data prediction device proposed in the embodiments of the present invention comprises: at least one memory and at least one processor, wherein the at least one memory is used to store a computer program; the at least one processor is used to call the computer program stored in the at least one memory, to execute the power load data prediction method described in an embodiment or implementation.

A cloud platform or server proposed in the embodiments of the present invention comprises a power load data prediction device described in an embodiment or implementation.

A computer-readable storage medium proposed in the embodiments of the present invention has a computer program stored thereon; it is characterized in that the computer program can be executed by a processor and implement the power load data prediction method described in an embodiment or implementation.

BRIEF DESCRIPTION OF THE DRAWINGS

The preferred embodiments of the present invention will be described in detail below with reference to the drawings, so that those skilled in the art will better understand the above and other features and advantages of the present invention. In the drawings:

FIG. 2A and FIG. 2B are schematic diagrams of the power load data in one example of the present invention. Wherein.

In the drawings, the following reference numerals are used:

| Numeral | Meaning |
| --- | --- |
| S102, S104, and S106 | Steps |
| 301 | One-dimensional data acquiring module |
| 302 | Data conversion module |
| 303 | Data prediction module |
| 304 | Data preprocessing module |
| 41 | Memory |
| 42 | Processor |

DETAILED DESCRIPTION OF THE EMBODIMENTS

The power load data prediction method proposed in an embodiment of the present invention comprises: acquiring historical power load data in a one-dimensional time series, which includes values at corresponding time points; mapping the values at corresponding time points to a coordinate system with points on the horizontal axis representing set time periods and points on the vertical axis representing time points in the time periods, and marking each mapping point with a predetermined pixel value corresponding to the value, to obtain a mapping image, wherein different values correspond to different pixel values; and inputting the pixel values of the mapping image into a trained data prediction model, and obtaining a predicted value of power load data output by the data prediction model.

In one implementation, the prediction model comprises: a feature extraction sub-model, obtained by training based on a constructed feature extraction neural network, taking the pixel values of the mapping image of power load data as the input nodes and key features as the output node; and a prediction sub-model, connected to the feature extraction sub-model, and obtained by training based on a constructed neural network with the characteristics of time series, taking the key features output by the feature extraction sub-model as the input nodes and power load data as the output nodes.

In one implementation, after obtaining historical power load data in the one-dimensional time series, the method further comprises: preprocessing the historical power load data in the one-dimensional time series, to supplement missing data and repair extreme data.

In one implementation, preprocessing the historical power load data in the one-dimensional time series is: using a trained data preprocessing model to preprocess the historical power load data in the one-dimensional time series.

In one embodiment, that different values correspond to different pixel values is: different values correspond to pixel values of different gray values, or different values correspond to color values of different colors.

In one implementation, the time period is one day, one week or any number of days required.

The power load data prediction device proposed in the embodiments of the present invention comprises: a one-dimensional data acquiring module, used to acquire historical power load data in a one-dimensional time series, which includes values at corresponding time points; a data conversion module, used to map the values at corresponding time points to a coordinate system with points on the horizontal axis representing set time periods and points on the vertical axis representing time points in the time periods, and mark each mapping point with a predetermined pixel value corresponding to the value, to obtain a mapping image, wherein different values correspond to different pixel values; and a data prediction module, used to input the pixel values of the mapping image into a trained data prediction model, and obtain a predicted value of power load data output by the data prediction model.

In one implementation, the prediction model comprises: a feature extraction sub-model, obtained by training based on a constructed feature extraction neural network, taking the pixel values of the mapping image of power load data as the input nodes and key features as the output node; and a prediction sub-model, connected to the feature extraction sub-model, and obtained by training based on a constructed neural network with the characteristics of time series, taking the key features output by the feature extraction sub-model as the input nodes and power load data as the output nodes.

In one implementation, the device further comprises: a data preprocessing module, used to preprocess the historical power load data in the one-dimensional time series, to supplement missing data and repair extreme data.

In one implementation, the data preprocessing module uses a trained data preprocessing model to preprocess the historical power load data in the one-dimensional time series.

Another power load data prediction device proposed in the embodiments of the present invention comprises: at least one memory and at least one processor, wherein, the at least one memory is used to store a computer program; the at least one processor is used to call the computer program stored in the at least one memory, to execute the power load data prediction method described in an embodiment or implementation.

A cloud platform or server proposed in the embodiments of the present invention comprises a power load data prediction device described in an embodiment or implementation.

A computer-readable storage medium proposed in the embodiments of the present invention has a computer program stored thereon; it is characterized in that the computer program can be executed by a processor and implement the power load data prediction method described in an embodiment or implementation.

It can be seen from the above solution that, in the embodiments of the present invention, since historical power load data in a one-dimensional time series is firstly converted to two-dimensional image data and then a trained prediction model is used to predict power load data based on the two-dimensional image data, accuracy of power load data prediction can be improved because the prediction method is based on historical power load data rather than user tags, and directly uses an intelligent neural network technique based on two-dimensional image data for prediction instead of techniques based on one-dimensional time series for time series analysis that tend to lose data characteristics.

In addition, in the use of the intelligent neural network technique, a neural network for feature extraction and a neural network with the characteristics of times series are constructed to train and predict secondary data, thereby making it easy to implement the process and ensuring prediction accuracy.

Further, historical power load data in the one-dimensional time series is preprocessed to supplement missing data and repair extreme data, thereby further ensuring prediction accuracy.

At the same time, the preprocessing of historical power load data in the one-dimensional time series by a data preprocessing model obtained by training based on the intelligent neural network technique can further improve prediction accuracy.

In order to be concise and intuitive in the description, the solution of the present invention is described below with reference to several representative embodiments. The large number of details in the embodiments are only used to help to understand the solution of the present invention. However, it is obvious that the technical solution of the present invention may not be limited to these details. In order to avoid unnecessarily obscuring the solution of the present invention, some embodiments are not described in detail, but only a framework is given. Hereinafter, "including" means "including but not limited to", and "according to . . . " means "at least according to . . . , but not limited to . . . ". Due to Chinese language habits, when the quantity of an element is not specified hereinafter, it means that there may be one or several of the element, or it can be understood as there is at least one of it.

In the embodiments of the present invention, consideration is given to the fact that techniques used in time series analysis are widely used since power load data can be characterized by time series, i.e., power load data are data in one-dimensional time series. However, some characteristics of historical data may be lost because time series analysis is based only on one-dimensional data for prediction. For this, in the embodiments of the present invention, through creative work, it is conceived to convert data in one-dimensional time series to two-dimensional image data, and then to predict power load data based on the two-dimensional image data by use of a trained prediction model.

The present invention is further described in detail with reference to the drawings and the embodiments, so that its technical solution and advantages become clearer. It should be understood that the specific embodiments described here are only used to illustratively explain the present invention, and are not used to limit the scope of the present invention.

Figure 1:
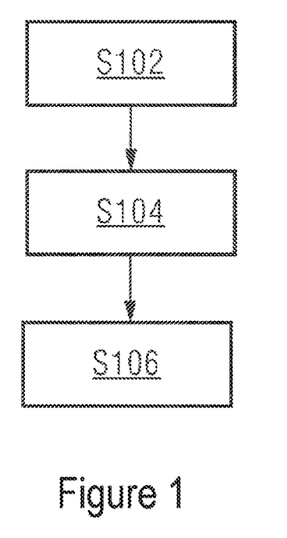
FIG. 1 is an example flowchart of a power load data prediction method in the embodiments of the present invention.

FIG. 1 is an example flowchart of a power load data prediction method in the embodiments of the present invention. As shown in FIG. 1, the method may comprise the following steps:

Step S102, acquiring historical power load data in a one-dimensional time series, which includes data at corresponding time points.

Figure 2A:
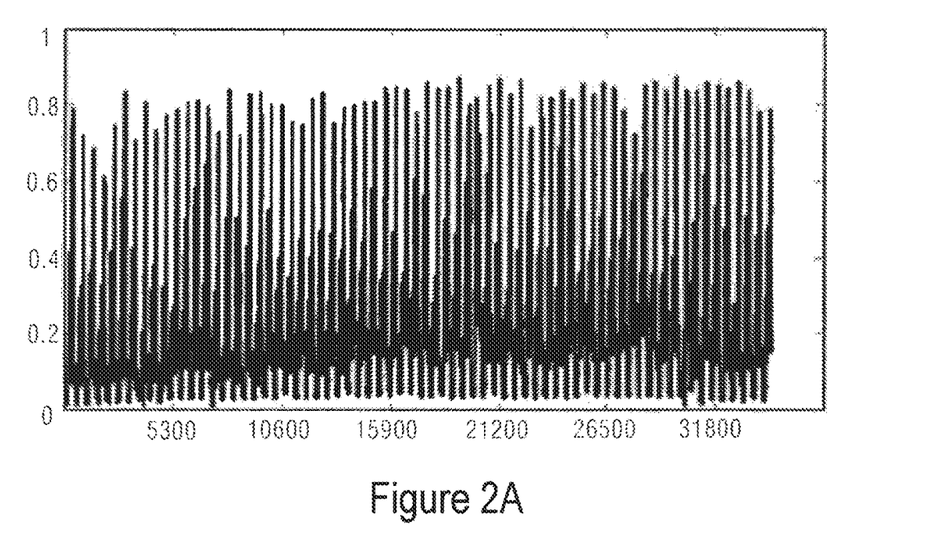
FIG. 2A is a coordinate system with the horizontal axis representing time points and the vertical axis representing values.

Taking historical power load data in one year for example, if the raw data is plotted based on time points, a diagram as shown in FIG. 2A will be obtained. In FIG. 2A, the vertical axis represents values, for example, load rates; the horizontal axis represents the time points sampled, for example, over 30,000 time points in one year if there are 96 time points in one day.

Step S104, mapping the values at corresponding time points to a coordinate system with points on the horizontal axis representing set time periods and points on the vertical axis representing time points in the time periods, and marking each mapping point with a predetermined pixel value corresponding to the value, to obtain a mapping image, wherein different values correspond to different pixel values.

Figure 2B:
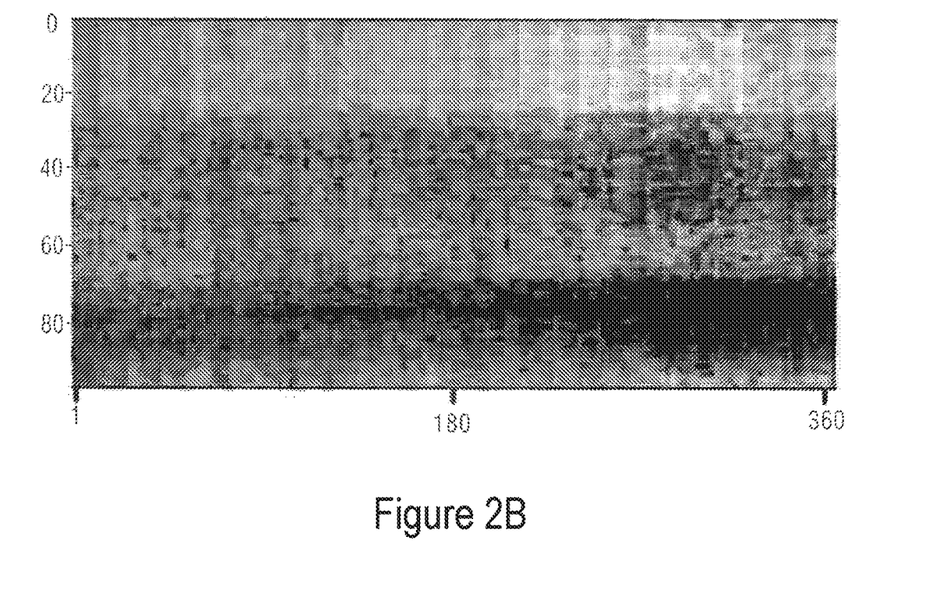
FIG. 2B is a two-dimensional image of a coordinate system with the horizontal axis representing time periods and the vertical axis representing the time points in a time period, and the values represented by colors.

For example, for the power load data in FIG. 2A, it is assumed that the set time period is one day, which, of course, may be one week or one month or 10 days, 15 days, 20 days, 25 days, 30 days, 40 days or any number of days required in actual application. The specific time period may be set based on actual needs, which is not limited here. Then, a coordinate system can be obtained, with the horizontal axis representing all the days in two years and the vertical axis representing all the time points in one day (for example, 96 time points in each day), and the image as shown in FIG. 2B can be obtained. In FIG. 2B, different gray values are used for different values, a darker color indicates a smaller value, and a lighter color indicates a greater value. In actual application, different color values may be used for different values. For example, a color range from red to yellow may be selected, where a greater value indicates a color closer to yellow and a smaller value indicates a color closer to red. In actual application, a representation by different color values will have better results.

FIG. 2B intuitively shows how power changes with time, i.e., the power value is lower at the beginning of each day and gradually increases afterwards. However, it is very difficult to show this by the data in the one-dimensional time series as shown in FIG. 2A.

Further, since FIG. 2B is a two-dimensional image of the raw data in the time series, it may sometimes seem noisy due to the existence of noises. In order to facilitate subsequent extraction of useful features or patterns from the image, a filter may be added to the embodiments of the present invention to filter the image to eliminate high-frequency noises and obtain a filtered image, wherein the filter may be any function as long as it can eliminate high-frequency noises. For example, in this embodiment, the two-dimensional Gaussian filter may be used to eliminate noises or tiny spots in FIG. 2B.

It can be seen that data in a one-dimensional time series in different time periods is converted to or reconstructed as a two-dimensional image by superposition, and the two-dimensional image after the conversion can demonstrate power load conditions, for example, power status of a transformer, more intuitively.

Step S106, inputting the pixel values of the mapping image into a trained data prediction model, and obtaining a predicted value of power load data output by the data prediction model.

In this step, the data prediction model may be a model obtained by training a single network, or a model obtained by training at least two networks in combination. For example, in one example, the data prediction model may comprise: a feature extraction sub-model and a prediction sub-model connected to the feature extraction sub-model, wherein the feature extraction sub-model may be obtained by training based on a constructed feature extraction neural network, for example, the convolutional neural network (CNN), taking the pixels values of the mapping image of power load data as the input nodes and key features as the output node. The prediction sub-model may be obtained by training based on a constructed neural network with the characteristics of time series, for example, the recurrent neural network (RNN), taking the key features output by the feature extraction sub-model as the input nodes and power load data as the output nodes.

In specific implementation of the above training process, a large number of sequences of known historical power load data may firstly be acquired, the data of the last set time period in time sequence may be taken as power load data to be predicted, i.e., the predicted power load data for training, the power load data before the set time period in time sequence may be used as the power load data prediction basis, on which the above Steps S102 and S104 are performed, the obtained mapping image for training is used as the input to the data prediction model, and the predicted power load data for training is used as the output of the data prediction model, to train the data prediction model.

In addition, the same applies to the above-mentioned data prediction model comprising a feature extraction sub-model and a prediction sub-model. It is only necessary to obtain the key features of the above mapping image for training, use the obtained key features as the key features for training, use the mapping image for training as the input to the feature extraction sub-model, and use the key features for training as the output of the feature extraction sub-model, to train the feature extraction sub-model; for the prediction sub-model, the key features for training are used as the input to the prediction sub-model, and the above predicted power load data for training is used as the output of the prediction sub-model, to train the prediction sub-model.

In one implementation, between Step S102 and Step S104, the method may further comprise: preprocessing the historical power load data in the one-dimensional time series, to supplement missing data and repair extreme data.

Specifically, the historical power load data in the one-dimensional time series may be preprocessed in various ways, for example, by use of various existing or new data processing techniques; or by use of a trained data preprocessing model to preprocess the historical power load data in the one-dimensional time series. The data preprocessing model may be obtained through training with acquired power load data without missing or extreme data.

The power load data prediction method in the embodiments of the present invention is described in detail above. The power load data prediction devices in the embodiments of the present invention will then be described below. The devices in the embodiments of the present invention may be used to implement the above method in the embodiments of the present invention. Please refer to the corresponding description of the method embodiments above for items not disclosed in detail for the device embodiments of the present invention, which will not be repeated here.

Figure 3A:
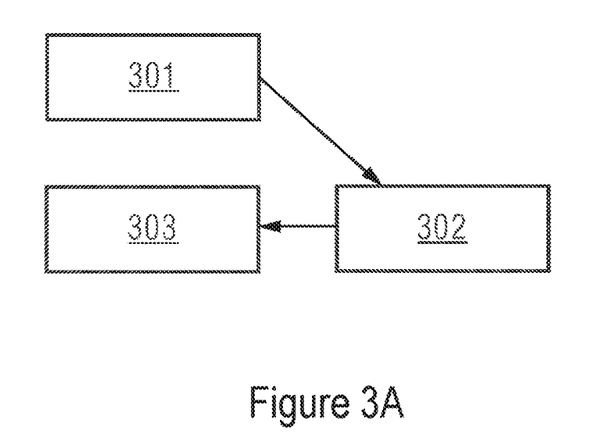
FIG. 3A is an example structural diagram of a power load data prediction device in the embodiments of the present invention.

FIG. 3A is an example structural diagram of a power load data prediction device in the embodiments of the present invention. As shown in FIG. 3A, the device may comprise: a one-dimensional data acquiring module 301, a data conversion module 302, and a data prediction module 303.

The one-dimensional data acquiring module 301 is used to acquire historical power load data in a one-dimensional time series, which includes data at corresponding time points.

The data conversion module 302 is used to map the values at corresponding time points to a coordinate system with points on the horizontal axis representing set time periods and points on the vertical axis representing time points in the time periods, and mark each mapping point with a predetermined pixel value corresponding to the value, to obtain a mapping image, wherein different values correspond to different pixel values.

The data prediction module 303 is used to input the pixel values of the mapping image into a trained data prediction model, and obtain a predicted value of power load data output by the data prediction model, wherein the data prediction model may be a model obtained by training a single network, or a model obtained by training at least two networks in combination. For example, in one example, the prediction model may comprise: a feature extraction sub-model and a prediction sub-model connected to the feature extraction sub-model, wherein the feature extraction sub-model may be obtained by training based on a constructed feature extraction neural network, taking the pixels values of the mapping image of power load data as the input nodes and key features as the output node. The prediction sub-model may be obtained by training based on a constructed neural network with the characteristics of time series, taking the key features output by the feature extraction sub-model as the input nodes and power load data as the output nodes.

Figure 3B:
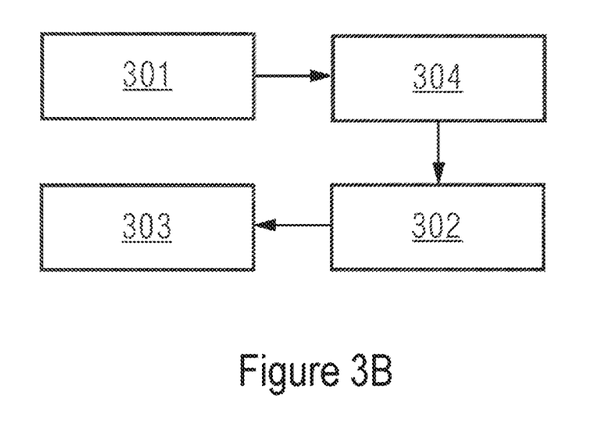
FIG. 3B is an example structural diagram of another power load data prediction device in the embodiments of the present invention.

In other implementations, the power load data prediction device in this embodiment may, as shown in FIG. 3B, further comprise: a data preprocessing module 304, used to preprocess the historical power load data in the one-dimensional time series, to supplement missing data and repair extreme data. Specifically, the data preprocessing module 304 may use a trained data preprocessing model to preprocess the historical power load data in the one-dimensional time series. The data conversion module 302 maps the preprocessed historical power load data in the one-dimensional time series onto a coordinate system.

Figure 4:
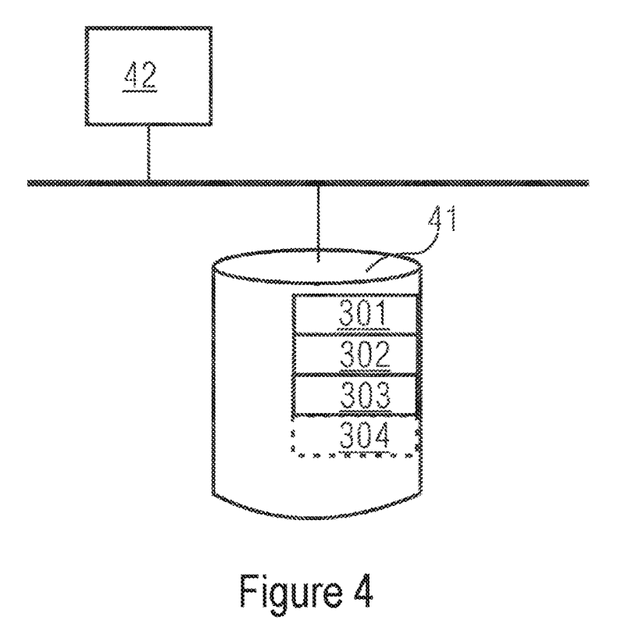
FIG. 4 is an example structural diagram of yet another power load data prediction device in the embodiments of the present invention.

FIG. 4 is an example structural diagram of yet another power load data prediction device in the embodiments of the present invention. As shown in FIG. 4, the device may comprise: at least one memory 41 and at least one processor 42. In addition, some other components, for example, communication ports, etc., may also be comprised. These components communicate via a bus.

The at least one memory 41 is used to store a computer program. In one implementation, the computer program may be understood as comprising each of the modules of the power load data prediction device as shown in FIG. 3. In addition, the at least one memory 41 may also store an operating system, etc. The operating system may be but is not limited to: an Android operating system, a Symbian operating system, a Windows operating system, a Linux operating system, etc.

The at least one processor 42 is used to call the computer program stored in the at least one memory 41 to execute the power load prediction methods described in the embodiments of the present invention. The processor 42 may be a CPU, a processing unit/module, and ASIC, a logic module, a programmable gate array, etc. It can receive and send data through the communication ports.

In addition, a server, or a server cluster, or a cloud platform, etc. comprising the power load data prediction device shown in FIG. 3 or 4 above is also provided in the embodiments of the present invention.

It should be noted that not all steps and modules in the above flowcharts and structural diagrams are necessary, and some steps or modules can be ignored based on actual needs. The sequence of execution of the steps is not fixed, and can be adjusted as needed. A functional division of the modules is used only to facilitate the description. In actual implementation, a module may be implemented by multiple modules, and the functions of multiple modules may be implemented by a single module. These modules may be located in a single device or in different devices.

It is understandable that the hardware modules in each embodiment above may be implemented mechanically or electronically. For example, a hardware module may comprise specially designed permanent circuits or logic devices (for example, dedicated processors, such as FPGA or ASIC) to complete specific operations. A hardware module may also comprise programmable logic devices or circuits temporarily configured by software (for example, general-purpose processors or other programmable processors) for performing specific operations. Whether to specifically use mechanical methods or dedicated permanent circuits or temporarily configured circuits (such as software configuration) to implement hardware modules may be determined according to cost and schedule considerations.

In addition, the embodiments of the present invention also provide a computer software that can be executed on a server or a server cluster or a cloud platform. The computer software can be executed by a processor and implement the power load data prediction method described in the embodiments of the present invention.

Moreover, a computer-readable storage medium is also provided in the embodiments of the present invention, which has a computer program stored thereon, which can be executed by a processor and implement the power load data prediction method described in the embodiments of the present invention. Specifically, a system or device equipped with a storage medium may be provided, and the software program code for implementing the functions of any of the above implementations is stored on the storage medium, so that a computer (or CPU or MPU) of the system or device reads and executes the program code stored in the storage medium. In addition, the operating system operating on the computer may also be used to perform part or all of the actual operations through instructions based on the program code. It is also possible to write the program code read from the storage medium to the memory provided in an expansion board inserted into the computer or to the memory provided in an expansion unit connected to the computer, and then the program code-based instructions cause the CPU, etc. mounted on the expansion board or the expansion unit to perform part and all of the actual operations, so as to implement the functions of any of the above embodiments. Implementations of the storage media used to provide the program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROMs. Optionally, the program code may be downloaded from a server computer via a communication network.

It can be seen from the above solution that, in the embodiments of the present invention, since historical power load data in a one-dimensional time series is firstly converted to two-dimensional image data and then a trained prediction model is used to predict power load data based on the two-dimensional image data, accuracy of power load data prediction can be improved because the prediction method is based on historical power load data rather than user tags, and directly uses an intelligent neural network technique based on two-dimensional image data for prediction instead of techniques based on one-dimensional time series for time series analysis that tend to lose data characteristics.

In addition, in the use of the intelligent neural network technique, a neural network for feature extraction and a neural network with the characteristics of times series are constructed to train and predict secondary data, thereby making it easy to implement the process and ensuring prediction accuracy.

Further, historical power load data in the one-dimensional time series is preprocessed to supplement missing data and repair extreme data, thereby further ensuring prediction accuracy.

At the same time, the preprocessing of historical power load data in the one-dimensional time series by a data preprocessing model obtained by training based on the intelligent neural network technique can further improve prediction accuracy.

The above are only the preferred embodiments of the present invention, and are not intended to limit the present invention. Any modification, equivalent replacement and improvement made without departing from the motivation and principle of the present invention shall be included in its scope.

What is claimed is:

1. A power load data prediction method, comprising:
   acquiring historical power load data in a one-dimensional time series, including respective historical power load data at corresponding time points of the one-dimensional time series;
   generating a mapping image, including pixel values corresponding to values of the historical power load data, by
      mapping respective values of the respective historical power load data at corresponding time points to a coordinate system, with points on a horizontal axis representing set time periods and points on a vertical axis representing time points in the time periods, and
      marking each respective mapping point with a pixel value corresponding to the respective value; and
   inputting the pixel values of the mapping image into a trained data prediction model, and obtaining a predicted value of power load data output by the trained data prediction model, the trained data prediction model including
      a feature extraction sub-model, obtained by training based on a constructed feature extraction neural network, taking the pixels values of the mapping image of power load data as input nodes and key features as output node, and
      a prediction sub-model connected to the feature extraction sub-model.

2. The power load data prediction method of claim 1, wherein the prediction sub-model is obtained by training based on a constructed neural network with characteristics of time series, taking the key features output by the feature extraction sub-model as the input nodes and power load data as the output nodes.

3. The power load data prediction method of claim 1, further comprising:
   supplementing missing data and repairing extreme data by preprocessing the historical power load data.

4. The power load data prediction method of claim 3, wherein the preprocessing the historical power load data includes:
   using a trained data preprocessing model to preprocess the historical power load data.

5. The power load data prediction method of claim 1, wherein the pixel values corresponding to values of the historical power load data include:
   different gray values, or color values of different colors.

6. The power load data prediction method of claim 1, wherein the time period is one day, one week or a number of days required.

7. A power load data prediction device, comprising:
   a memory; and
   at least one processor configured to cause the power load data prediction device to
      acquire historical power load data in a one-dimensional time series, including respective historical power load data at corresponding time points of the one-dimensional time series;
      generate a mapping image, including pixel values corresponding to values of the historical power load data, by
         mapping respective values of the respective historical power load data at corresponding time points to a coordinate system, with points on a horizontal axis representing set time periods and points on a vertical axis representing time points in the time periods, and
         marking each respective mapping point with a pixel value corresponding to the respective value, and
      input the pixel values of the mapping image into a trained data prediction model, and obtain a predicted value of power load data output by the trained data prediction model, the trained data prediction model including
         a feature extraction sub-model, obtained by training based on a constructed feature extraction neural network, taking the pixels values of the mapping image of power load data as input nodes and key features as output nodes, and
         a prediction sub-model connected to the feature extraction sub-model.

8. The power load data prediction device of claim 7, wherein the prediction sub-model is obtained by training based on a constructed neural network with characteristics of time series, taking the key features output by the feature extraction sub-model as the input nodes and power load data as the output nodes.

9. The power load data prediction device of claim 7, wherein the at least one processor is further configured to cause the power load prediction device to:
   supplement missing data and repair extreme data by preprocessing the historical power load data.

10. The power load data prediction device of claim 9, wherein the at least one processor is further configured to cause the power load data prediction device to preprocess the historical power load data via a trained data preprocessing model.

11. A power load data prediction device, comprising:
at least one memory configured to store a computer program; and
at least one processor configured to execute the computer program stored in the at least one memory, the computer program configured to cause the power load data prediction device to
acquire historical power load data in a one-dimensional time series, including respective historical power load data at corresponding time points of the one-dimensional time series;
generate a mapping image, including pixel values corresponding to values of the historical power load data, by
mapping respective values of the respective historical power load data at corresponding time points to a coordinate system, with points on a horizontal axis representing set time periods and points on a vertical axis representing time points in the time periods, and
marking each respective mapping point with a pixel value corresponding to the respective value, and
input the pixel values of the mapping image into a trained data prediction model, and obtaining a predicted value of power load data output by the trained data prediction model, the trained data prediction model including
a feature extraction sub-model, obtained by training based on a constructed feature extraction neural network, taking the pixels values of the mapping image of power load data as input nodes and key features as output node, and
a feature extraction sub-model, obtained by training based on a constructed feature extraction neural network, taking the pixels values of the mapping image of power load data as input nodes and key features as output node, and
a prediction sub-model connected to the feature extraction sub-model.

12. A cloud platform or server, comprising the power load data prediction device of claim 7.

13. A non-transitory computer-readable storage medium, storing a computer program that, when executed by a processor, causes the processor to implement the power load data prediction method of claim 1.

14. The power load data prediction method of claim 2, further comprising:
supplementing missing data and repairing extreme data by preprocessing the historical power load data.

15. The power load data prediction method of claim 14, wherein the preprocessing the historical power load data includes:
using a trained data preprocessing model to preprocess the historical power load data.

16. The power load data prediction method of claim 2, wherein the pixel values corresponding to values of the historical power load data include:
different gray values, or color values of different colors.

17. The power load data prediction method of claim 2, wherein the time period is one day, one week or a number of days required.

18. The power load data prediction device of claim 8, wherein the at least one processor is further configured to cause the power load prediction device to:
supplement missing data and repair extreme data by preprocessing the historical power load data.

19. The power load data prediction device of claim 18, wherein the at least one processor is further configured to cause the power load data prediction device to preprocess the historical power load data via a trained data preprocessing model.

20. A cloud platform or server, comprising the power load data prediction device of claim 11.

* * * * *